United States Patent [19]

Rinck et al.

[11] Patent Number: 5,147,907
[45] Date of Patent: Sep. 15, 1992

[54] PROCESS OF PRODUCING AQUEOUS POLYMER DISPERSIONS

[75] Inventors: Günter Rinck, Frankfurt; Knut Möller, Neuberg; Sigismund Füllert, Frankfurt; Frank Krause, Kleve, all of Fed. Rep. of Germany; Helmut Koch, Tervuren, Belgium

[73] Assignees: Synthomer Chemie GmbH, Frankfurt am Main, Fed. Rep. of Germany; Cerestar Holding B.V., Sas Van Gent, Netherlands

[21] Appl. No.: 550,630

[22] Filed: Jul. 10, 1990

[30] Foreign Application Priority Data

Jul. 11, 1989 [DE] Fed. Rep. of Germany ....... 3922784

[51] Int. Cl.$^5$ .................................. C08L 3/02
[52] U.S. Cl. ................................. 524/48; 524/47; 524/734; 524/819; 524/821; 524/822; 524/836; 526/200
[58] Field of Search ............. 526/200; 524/734, 48, 524/47, 734, 821, 836, 819

[56] References Cited

U.S. PATENT DOCUMENTS

| | | | |
|---|---|---|---|
| 2,857,367 | 10/1958 | Kearney | 526/200 |
| 3,271,336 | 9/1966 | Warson et al. | 524/734 |
| 3,647,773 | 3/1972 | Ohe et al. | 526/200 X |
| 4,855,343 | 8/1989 | Degen et al. | 524/734 X |
| 5,004,767 | 4/1991 | Krause et al. | 524/734 X |

FOREIGN PATENT DOCUMENTS

| | | | |
|---|---|---|---|
| 58-87105 | 5/1983 | Japan. | |
| 0726927 | 3/1955 | United Kingdom | 524/734 |

*Primary Examiner*—Fred Teskin
*Attorney, Agent, or Firm*—Felfe & Lynch

[57] ABSTRACT

A process is described for the production of an aqueous polymer dispersion by polymerization of ethylenically unsaturated compounds by means of free-radical initiators in the presence of starch and/or starch derivatives and optional further conventional adjuvants, and which the dispersions are coagulate-free, have a low viscosity, and a small particle size, said process comprising polymerizing an ethylenically unsaturated diene monomer or mixture of monomers consisting of 20 to 100% by weight of a diene,
    0 to 80% by weight of a vinyl-aromatic monomer,
    0 to 50% by weight of an ethylenically unsaturated monomer in the presence of an aqueous solution or dispersion of dextrins containing 10 parts to 200 parts by weight dextrins, which are optionally chemically modified, wherein the content of said dextrins having a molecular weight in excess of 5000 is at least 50% by weight and the content of dextrins having a molecular weight in excess of 100,000 is not in excess of 5% by weight of the dextrin component.

21 Claims, No Drawings

PROCESS OF PRODUCING AQUEOUS POLYMER DISPERSIONS

FIELD OF THE INVENTION

This invention relates to a process of producing aqueous polymer dispersions by polymerization of ethylenically unsaturated compounds by means of free-radical initiators in the presence of starch and/or starch derivatives, and optional further conventional adjuvants.

BACKGROUND OF THE INVENTION

It is known to produce polymer dispersions in the presence of starch or starch derivatives acting as a protective colloid. In the emulsion polymerization process described in Published Japanese patent application no. 58/87, 105, 0.5% to 5% by weight graftable, ethylenically unsaturated monomers are polymerized together with other monomers and 10% to 50% by weight of a polysaccharide having a low molecular weight in an aqueous solution. The monomers may be mono- or diolefinic compounds and will form stable lactices only in the critical proportions which have been stated.

Paper sizing agents described in Published European patent application no. 257,412 are based on copolymer dispersions prepared by emulsion polymerization of acrylonitrile, acrylic esters and optionally other ethylenically unsaturated compounds, such as unsaturated carboxylic acids, in the presence of broken down starch. Copolymer dispersions having a relatively low solids content of about 20% to 30% by weight are apparent from the examples.

Published European patent application no. 134,449 discloses a process of producing an aqueous polymer dispersion by the emulsion polymerization of ethylenically unsaturated compounds in the presence of starch and at least 0.6% by weight starch derivatives. Before the polymerization begins, 0.5% by weight starch derivatives acting as a protective colloid are added to the reaction mixture. In this process, organic hydroperoxides are used as radical-forming initiators at reaction temperatures of 10° C. to 100° C. The resulting polymer dispersions have relatively large particle diameters of 235 nm to 3500 nm. The polymer dispersions produced by the aforesaid process may be used, e.g., as adjuvants in the production of textiles and paper.

Such known processes and the polymer dispersions obtained therefrom are not yet satisfactory in all cases in industrial practice as the solids content of such dispersions generally are uneconomically low or said dispersions have high viscosities which result in disadvantages during processing.

It is therefore an object of the present invention to provide a process for the production of polymer dispersions with the aid of starch which can be carried out in a simple manner and which result in stable, flowable, aqueous polymer dispersions having a low viscosity and a high solids content of at least 50% by weight. It is a further object of this invention to provide such a process for the production of polymer dispersions, wherein the polymer particles have a small particle diameter.

Additional objects of this invention will become apparent from the following discussion.

SUMMARY OF THE INVENTION

The present invention provides a process for producing aqueous polymer dispersions by polymerization of ethylenically unsaturated compounds via free-radical initiators in the presence of starch and/or starch derivatives and optional conventional adjuvants.

Specifically, in accordance with the present inventive process, 100 parts by weight monomer or mixed monomers consisting of 20 to 100% by weight of a diene,
    0 to 80% by weight of a vinyl-aromatic monomer,
    0 to 50% by weight of an ethylenically unsaturated monomer are polymerized in a semicontinuous process in the presence of 10 parts to 200 parts by weight dextrins, and in which the content of dextrins having a molecular weight in excess of 5000 is at least 50% by weight and the content of dextrins having a molecular weight in excess of 100,000 is not in excess of 5% by weight. Further, the dextrins are optionally chemically modified.

In the process of the invention, the unsaturated monomers employed consist only of dienes or of dienes mixed with other copolymerizable unsaturated monomers.

Suitable dienes include, e.g., 1,3-butadiene, isoprene, and cyclobutadiene. 1,3-Butadiene is preferred.

Suitable copolymerizable unsaturated monomers include vinyl-aromatic compounds, such as styrene, alpha-methylstyrene, 4-methylstyrene; ethylenically unsaturated monomers, such as (meth)acrylic esters of C1 to Ca alcohols, e.g., ethyl (meth)acrylate, butyl (meth)acrylate, stearyl acrylate, (meth)acrylonitrile; unsaturated mono- or dicarboxylic acids, e.g., (meth)acrylic acid, maleic acid, fumaric acid, itaconic acid; and amides of unsaturated monocarboxylic acids, e.g., (meth)acrylamide. Other monomers which may be used include anionic comonomers, such as salts of styrenesulfonic acid or of acrylamidoalkylsulfonic acids; cationic comonomers, such as 2-dimethylaminoethyl (meth)acrylate, N-di-methylaminopropyl (meth)acrylamide, 2-trimethylammoniummethyl (meth)acrylate-chloride and N-trimethylammoniumpropyl (meth)acrylamide-chloride; and multifunctional cross-linking comonomers, such as divinylbenzene or methylol (meth)acrylamides and their derivatives, such as i-propoxymethyl (meth)acrylamide or methoxymethyl (meth)acrylamide.

In addition to the diene, the vinyl-aromatic monomers are used in amounts of up to 80% by weight and the ethylenically unsaturated monomers in amounts of up to 50% by weight of the total amount of monomers. The specific selection of the aforesaid compounds will depend on the contemplated end uses of the resulting copolymer. The criteria for the selection are known to those skilled in the art or can easily be determined without undue experimentation for obtaining guidance.

In the presence of the present invention the selection of the composition of the mixed monomers is not restricted by the stability of the dispersion. In the recited concentration ranges of 20% to 100% by weight diene, 0% to 80% by weight vinyl-aromatic monomer, and 0% to 50% by weight ethylen unsaturated monomer, the dextrin-containing polymer dispersion can be polymerized without coagulation.

Other conventional additives may be added to the reaction mixture if desired. Such additives can include, for example, nucleating lattices which will improve the reproducibility of the particle size of the end products, buffers, complexing agents, dispersing agents and emulsifying agents. The use of emulsifying agents or dispersing agents in addition to the dextrin component, which acts also as a protective colloid, generally will not be required.

In accordance with the present inventive process it has been surprisingly and unexpectedly found that it is critical and essential that the content of dextrins having a molecular weight in excess of 100,000 is not in excess of 5% by weight of the dextrins which are employed. On the other hand, a decomposition of the dextrin to an excessive degree will adversely affect the properties of the dextrin-containing polymer dispersions from the aspect of application technology. For this reason the content of dextrins having a molecular weight below 5000 should not exceed 50% by weight, preferably 45% by weight, and most preferably 35% by weight, of the entire dextrin component. The average molecular weight of the decomposed dextrins has no decisive influence on the stability and viscosity of the dispersions produced by the process according to the invention.

The present inventive process can be carried out in a particularly preferred manner if the content of dextrins having a molecular weight in excess of 5000 is at least 55% by weight, and most preferably at least 65% by weight of the entire dextrin component.

Dextrins are starch decomposition products having the general formula $(C_6H_{10}O_5)_n \times H_2O$. They are formed by an incomplete hydrolysis of starch with dilute acids or by an action of heat, and consist of glucose chains.

The dextrins used in the present inventive process are produced by known processes. For example, starch is decomposed by the action of heat (with or without an addition of chemicals, such as acids), whereby the amylose and amylopectin molecules are broken down. A recombination of molecules may occur. The kind and duration of such treatment will determine the resulting average molecular weight and molecular weight distribution of the dextrins. The starting starches for the breakdown reaction may consist of native or modified starches. A process of modifying starch is, e.g., an oxidation reaction which results in the formation of aldehyde and carboxyl groups. Other substituents may consist of ester groups or cationic groups (such as tert.-aminoalkyl or quaternary ammoniumalkyl groups).

In a preferred embodiment of the process of this invention the entire amount of the aqueous dextrin solution or dispersion is continuously fed to a polymerization reactor over the course of a predetermined period of time and at the same time as the monomer or monomer mixture.

In a particularly preferred embodiment of the present invention the aqueous dextrin solution or dispersion is intensely and homogeneously mixed immediately before the addition thereof to the polymerization reactor and the mixture is immediately and continuously charged into the polymerization reaction without any delay.

An intense mixing may be effected by conventional mixing means, such as containers provided with high-speed stirrers or, to special advantage, in so-called static or dynamic mixing tubes. Such means will permit the use of particularly economical equipment in a semicontinuous polymerization plant.

In accordance with a further feature of the present invention, a cationically modified dextrin can be used.

Dextrins are used in the present invention in an amount of 10 parts to 200 parts by weight, and preferably in an amount of 25 parts to 100 parts by weight, solids per 100 parts by weight of monomer or mixed monomers. Polymerization is effected at temperatures of 0° C. to 120° C., and preferably 40° C. to 100°C.

In a particularly preferred embodiment of the process according to the present invention, the monomer and dextrin components are jointly charged into a polymerization reactor as a homogeneous mixture and the major part of the initiator, which is contained in an aqueous fluid, is simultaneously metered into the reactor as a separate stream. In order to ensure by a stirring action a good distribution of the individual components from the beginning, water which contains a small amount of the initiator is suitably provided in the reactor at the beginning. The initiator or the mixed initiators is or are used in amounts of at least 0.1% by weight, preferably in amounts of 1% to 3% by weight, of the total amount of monomer.

The free-radical initiators which are employed may consist of hydrogen peroxide, organic peroxides and hydroperoxides, optionally in combination with reducing compounds, such as sodium hydrogen sulfite or sodium formaldehyde sulfoxylate or water soluble azo compounds. In accordance with this invention the use of alkali metal salts or ammonium salts of peroxydisulfuric acid in an amount of at least 0.1% by weight of the total amount of monomers is particularly desirable.

In the process according to the invention, preferred mixed monomeric compositions employed are composed of 20 to 70% by weight 1,3-butadiene, 30 to 80% by weight styrene, 0 to 15% by weight acrylonitrile, 0 to 5% by weight ethylenically unsaturated mono- or dicarboxylic acid, particularly acrylic acid and-/or itaconic acid.

As mentioned hereinabove a reaction temperature between 0° C. and 120° C. during polymerization is maintained. Such a reaction temperature is preferably chosen such that the half-life of the free-radical initiators is so short that sufficiently fast reactions will be ensured. For example, if peroxydisulfates are employed, the preferred temperature range is between 40° C. and 100° C. The pressure is not controlled during the polymerization reaction and will amount to the sum of the partial pressures of the reaction components at a selected reaction temperature. When the reaction has been terminated the reaction mixture is subjected to conventional water vapor distillation methods to remove the residue monomers. The average particle diameter of the polymer dispersions is below 250 nm. The Brookfield viscosity of the polymer dispersions according to the invention, measured at a solids content of 50±1% by weight, is below 2000 mPa s and the solids concentration is at least 50% by weight.

The dextrin polymer dispersions of this invention may desirably be used to produce adhesives, such as sizes for paper or plastic sheetings; water-resistant glues for wood; as adjuvants in the making of coloring materials, textiles or paper; as a binder for pigmented coatings, such as coatings for carpet backings or paper-coating compositions; as a binder for mineral pigments or fibers; and in the building materials industry, e.g., as an additive for hydraulically setting compositions.

The present inventive process affords advantages over known processes by permitting a simple and economical production of dextrin-polymer dispersions which have a low viscosity and, after water vapor distillation or stripping, have a high solids content of at least 50% by weight. Further, the dispersions are free of coagulum and hard spots and have a small particle size. From the aspect of application technology the properties of the dextrin-containing polymer dispersion in accordance with this invention are greatly superior to the properties of similarly simple mixtures of a dextrin component and a polymer dispersion. The dispersions in accordance with the invention have a lower susceptibility to water and, e.g., the resistance to picking of coatings on paper and cardboard in a wet state is distinctly increased.

The subject matter of the invention will be explained in more detail by way of the following examples. It is to be understood, however, that the examples are for illustrative purposes only and are not intended to limit the scope of the invention or the claims in any way.

In the following Examples (1 to 7) and in Comparative Examples (V1, V2), various modified dextrins having different average molecular weights and different molecular weight distributions are employed. From the results it is apparent that end products which are unstable or have an excessively high viscosity will be obtained if dextrins are used which are not of a type required in accordance with this invention.

EXAMPLES 1 to 7

In carrying out these Examples, five mixtures or solutions having the following compositions are prepared for each Example:

Mixture A
  8 parts by weight water
  0.05 parts by weight sodium salt of ethylenediaminotetraacetic acid
Mixture B
  2 parts by weight water
  0.05 parts by weight ammonium peroxydisulfate
Mixture C
  36 parts by weight 1,3-butadiene
  54.5 parts by weight styrene
  7.5 parts by weight acrylonitrile
  1 part by weight acrylic acid
  1.25 parts by weight dodecylmercaptan
Mixture D
  120 parts by weight water
  1 part by weight itaconic acid
  1.5 parts by weight nucleating latex having a particle size of 40 nm
  50 parts by weight dextrin of types I to VII (see Table 2, quantities as stated in Table 1)
Mixture E
  20 parts by weight water
  0.95 parts by weight ammonium peroxydisulfate Mixture A is charged into a 4-liter stirrer-autoclave and the reactor is subsequently heated up. When a reaction temperature of 90° C. has been reached, mixture B is added. Immediately thereafter, mixtures C, D and E are metered into the reactor at the same time. Before mixtures C and D enter the autoclave they are passed through an in-line mixer by which said two streams are thoroughly mixed. Mixture E is separately metered. Mixtures C, D and E are metered into the autoclave at a constant rate within 6 hours. After a subsequent after-reaction time of one hour, a dextrin-containing polymer dispersion is obtained, which has the properties summarized in Table 2 below. The resulting properties of the obtained polymer dispersions after the residual monomers have been removed by water vapor distillation (stripping) and the pH value has been increased to 6 are also summarized in Table 2.

COMPARATIVE EXAMPLES V1 AND V2

A polymerization reaction is carried out as in Examples 1 to 7, except that dextrins VIII and IX (see Table 1), which do not have properties required in the present inventive process, are employed respectively in these Comparative Examples.

The resulting polymers are either non-flowable or completely coagulated. The results of these Comparative Examples are also summarized below in Table 2.

TABLE 1

| Dextrin Type | Designation | Number average of molecular weight g/mole | Proportion of molecular weight >5000 % by weight | Proportion of molecular weight >100,000 % by weight |
|---|---|---|---|---|
| I | 07082 2) | 4,700 | 66.0 | 0 |
| II | 07380 2) | 3,300 | 68.7 | 0.5 |
| III | 08320 2) | 3,400 | 66.5 | 0 |
| IV | 08380 2) | 3,400 | 66.1 | 2.8 |
| V | Tackidex JO 55 K 3) | 4,100 | 70.4 | 0.6 |
| VI | acetylated dextrin 4) | 5,830 | 79.8 | 0 |
| VII | carboxylated dextrin No. 1 4) | 5,900 | 78.2 | 3.6 |
| VIII 1) | 07321 2) | 4,700 | 83.8 | 6.9 |
| IX 1) | carboxylated dextrin No. 2 4) | 10,900 | 86.0 | 14.6 |

1) No dextrin present such as required in accordance with the invention
2) Corn dextrin of Cerestar GmbH, Krefeld
3) Corn dextrin of Roquette, Lille, France
4) Chemically modified dextrins of Cerestar GmbH, Krefeld

TABLE 2

| Experiment No. | Dextrin Type | Properties of reactor effluent Solids content % by weight | Properties of reactor effluent ph | Properties of reactor effluent Viscosity mPa s | Properties after stripping Solids content % by weight | Properties after stripping pH | Properties after stripping Viscosity mPa S | Particle size nm |
|---|---|---|---|---|---|---|---|---|
| 1 | I | 48.1 | 1.8 | 980 | 50.3 | 6.0 | 1300 | 250 |
| 2 | II | 48.4 | 2.0 | 780 | 50.3 | 5.8 | 1300 | 221 |
| 3 | III | 50.0 | 1.9 | 160 | 50.2 | 6.0 | 180 | 209 |
| 4 | IV | 48.0 | 1.8 | 100 | 50.2 | 6.0 | 190 | 180 |
| 5 | V | 48.9 | 2.1 | 1080 | 50.5 | 5.8 | 1500 | 183 |
| 6 | VI | 49.7 | 1.9 | 670 | 50.7 | 5.8 | 300 | 179 |
| 7 | VII | 49.6 | 2.1 | 1780 | 48.8 | 5.8 | 495 | 194 |
| V1 1) | VIII | Charge was completely coagulated | | | | | | |
| V2 1) | IX | Dispersion was not flowable | | | | | | |

1) Not in accordance with the invention

The following experiments are intended to show the wide field of application of the process in accordance with the invention.

EXAMPLES 8 to 10

In these examples polymers are produced with the aid of different quantities of a dextrin and with the additional use of an anionic emulsifying agent. Five mixtures or solutions were again prepared for each experiment to be carried out. Mixtures A and B have the same compositions as for Examples 1 to 7. Mixtures C, D and E have the following compositions:

Mixture C
- 36 parts by weight 1,3-butadiene
- 47 parts by weight styrene
- 13 parts by weight acrylonitrile
- 1 part by weight acrylic acid
- 1.25 parts by weight dodecylmercaptan Mixture D
- Varying parts by weight water (quantities see Table 3)
- 3 parts by weight itaconic acid
- 1.5 parts by weight nucleating latex having a particle size of 40 nm
- Varying parts by weight Dextrin III (see Table 1, amounts as stated in Table 3)

Mixture E
- 20 parts by weight water
- 0.6 parts by weight sodium salt of an alkyldiphenyl ether sulfonate (Dowfax 2A1 of Dow Chemical Company)
- 0.95 parts by weight ammonium peroxydisulfate The polymerization is effected as in Examples 1 to 7. The properties of the resulting polymer dispersions are summarized below in Table 3.

EXAMPLES 11 and 12

In Examples 11 and 12, polymers are produced with the aid of a dextrin in varying amounts without the additional use of an anionic emulsifying agent. Five mixtures or solutions are again prepared for each experiment. Mixtures A, B, C and E have the same compositions as in Examples 1 to 7. Mixture D has the following composition:

Mixture D
- Variable parts by weight water
- 1 part by weight itaconic acid
- 1.5 parts by weight nucleating latex having a particle size of 40 nm
- variable parts by weight of Dextrin III (see Table 1, amounts as stated in Table 3)

The results of these examples are summarized below in Table 3.

In the following Examples 13 and 14, the influence of the polymerization process on the properties of the resulting dextrin-containing polymer dispersion is shown. From the results it is apparent that polymer dispersions having a particularly low viscosity are produced in a preferred embodiment of the invention wherein the entire dextrin component is continuously charged into the polymerization reactor.

EXAMPLE 13

For this experiment, four mixtures or solutions having the following compositions are prepared:

Mixture A
- 78 parts by weight water
- 3 parts by weight itaconic acid
- 0.05 parts by weight sodium salt of ethylenediaminotetraacetic acid
- 0.1 parts by weight sodium salt of an alkyldiphenyl ether disulfonate (Dowfax 2A1 of Dow Chemical Company)
- 1.5 parts by weight nucleating latex having a particle size of 40 nm
- 10 parts by weight Dextrin III (see Table 2)

Mixture B
- 2 parts by weight water
- 0.1 part by weight ammonium peroxydisulfate Mixture C
- 36 parts by weight 1,3-butadiene
- 47 parts by weight styrene
- 13 parts by weight acrylonitril
- 1 part by weight acrylic acid
- 1.25 parts by weight dodecylmercaptan Mixture D
- 30 parts by weight water
- 0.5 part by weight sodium salt of an alkyldiphenyl ether disulfonate (Dowfax 2A1 of Dow Chemical company)
- 0.9 part by weight ammonium peroxydisulfate Mixture A is charged into a 4-liter stirrer-autoclave and the reactor is subsequently heated up. When a reaction temperature of 90° C. has been reached, mixture B is added. Immediately thereafter, mixtures C and D are metered at the same time. The mixtures are separately metered into the autoclave at a constant rate within 6 hours. After a subsequent afterreaction time of one hour, a dextrin-containing polymer dispersion is obtained. The respective properties of the resulting dispersion as a reactor effluent and after stripping are summarized below in Table 3.

EXAMPLE 14

For this example, five mixtures or solutions having the following compositions are prepared.

Mixture A
- 28 parts by weight water
- 0.05 parts by weight sodium salt of ethylenediaminetetraacetic acid
- 1.5 parts by weight nucleating latex having a particle size of 40 nm Mixture B
- 2 parts by weight water
- 0.05 parts by weight ammonium peroxydisulfate Mixture C
- 36 parts by weight 1,3-butadiene
- 54.5 parts by weight styrene
- 7.5 parts by weight acrylonitrile
- 1.0 parts by weight acrylic acid
- 1.25 parts by weight dodecylmercaptan Mixture D
- 120 parts by weight water
- 1 part by weight itaconic acid
- 50 parts by weight Dextrin III (see Table 2)

Mixture E
- 10 parts by weight water
- 0.95 parts by weight ammonium peroxydisulfate Polymerization is effected as described in Examples 1 to 7 with the difference that mixtures C and D are separately metered. The resulting dextrin-containing polymer dispersion has properties summarized below in Table 3.

EXAMPLE 15

A cationically modified dextrin is used in this Example.

Five mixtures of solutions having the following compositions are prepared:

Mixture A
  8 parts by weight water
  0.05 parts by weight sodium salt of ethylenediaminetetraacetic acid
Mixture B
  2 parts by weight water
  0.05 parts by weight ammonium peroxydisulfate
Mixture C
  36 parts by weight 1,3-butadiene
  54.5 parts by weight styrene
  7.5 parts by weight acrylonitrile
  1.25 parts by weight dodecylmercaptan
Mixture D
  120 parts by weight water
  50 parts by weight of a cationically modified dextrin in accordance with the invention
    (from Cerestar GmbH, Krefeld)
Mixture E
  20 parts by weight water
  0.95 parts by weight ammonium peroxydisulfate The polymerization is effected as described in Examples 1 to 7. The resulting cationic polymer dispersion has a zeta potential of 22.8 mV. Other properties of this polymer dispersion are summarized below in Table 3.

TABLE 3

| Example | Amount of water in Mixt. D % by weight | Amount of dextrin % by weight | Properties of reactor effluent | | Properties after stripping | | | |
|---|---|---|---|---|---|---|---|---|
| | | | Solids content % by weight | Viscosity mPa s | ph | Solids content % by weight | pH | Viscosity mPa s | Particle size nm |
| 8 | 80 | 10 | 49.3 | 2.6 | 230 | 51.8 | 6.0 | 365 | 188 |
| 9 | 80 | 20 | 51.1 | 2.3 | 580 | 51.8 | 6.0 | 580 | 182 |
| 10 | 100 | 50 | 53.5 | 2.1 | 850 | 50.3 | 6.0 | 650 | 173 |
| 11 | 120 | 50 | 50.0 | 1.9 | 160 | 50.2 | 6.0 | 180 | 209 |
| 12 | 180 | 100 | 49.0 | 1.8 | 240 | 55.1 | 6.0 | 380 | 196 |
| 13 | 30 | 10 | 49.2 | 3.2 | 3400 | 48.5 | 6.0 | 1280 | 170 |
| 14 | 120 | 50 | 47.9 | 1.8 | 85 | 50.3 | 6.0 | 245 | 183 |
| 15 | 120 | 50 | 49.3 | 1.9 | 700 | 50.4 | 4.8 | 680 | 197 |

EXAMPLES 16 to 19

Advantages afforded by the dextrin-containing polymer dispersion of the present invention from the aspect of application technology are shown by these Examples.

For this purpose, four colored paper-coating compositions composed as summarized below in Table 4 are prepared and by use of a laboratory doctor are coated onto a woodpulp-containing raw paper (weight 36 g/m$^2$). The applied coating composition weighs 12 g/m$^2$. The coated sheets are then dried (3 minutes, 110° C.), calendered (70° C., 700 N/cm) and subjected to the following tests:

1. Test for resistance to picking in a wet state by means of the proofing press in the test house (low coefficients of diffuse reflection indicate a high resistance to picking in a wet state).
2. Test for resistance to picking in a dry state by means of the IGT proofing press (high values indicate a high resistance to picking in a dry state).

The results summarized in Table 4 indicate that the dispersions prepared in accordance with the present invention (Examples 16-17) result in an unchanged high resistance to picking in a dry state and in distinctly higher resistance to picking in a wet state, compared to the results obtained for mixtures which are not prepared in accordance with the invention (Comparative Examples 18-19).

TABLE 4

| Component | | Composition/Experiment No. | | | |
|---|---|---|---|---|---|
| | | 16 | 17 | 18 | 19 |
| Calcium carbonate (Hydrocarb 90 +1) | parts by weight | 30.0 | 30.0 | 30.0 | 30.0 |
| Clay SPS (Speswhite +2) | parts by weight | 70.0 | 70.0 | 70.0 | 70.0 |
| Dispersing agent (Polysalz F +3) | parts by weight | 0.25 | 0.25 | 0.25 | 0.25 |
| Ca stearate (Ombrelube FC 544 +4) | parts by weight | 0.1 | 0.1 | 0.1 | 0.1 |
| Dispersion 11 (see Table 3) | parts by weight | 14.0 | — | — | — |
| Dispersion 14 (see Table 3) | parts by weight | — | 14.0 | — | — |
| Control dispersion +5) | parts by weight | — | — | 9.5 | 9.5 |
| Dextrin No. III (see Table 1) | parts by weight | — | — | 4.5 | — |
| Control starch +6) | parts | — | — | — | 4.5 |
| Solids content | % by weight | 55.0 | 55.0 | 55.0 | 55.0 |
| pH value | | 9.0 | 9.0 | 9.0 | 9.0 |
| Viscosity of coating compositions | mPa s | 173 | 165 | 60 | 1790 |
| Resistance to picking in wet state | % remission | 11.9 | 15.3 | 54.5 | 39.5 |
| Resistance to picking in dry state | cm/s | 115 | 115 | 105 | 105 |

+1) Omya Gmbh, Cologne;  +2) ECC, Düsseldorf;
+3) BASF, Ludwigshafen;  +4) Münzig Chemie GmbH, Heilbronn;
+5) Starchfree polymer dispersion in other respects composed like Dispersion 11;
+6) Commercially available starch (Amysol 5582 of Cerester GmbH, Krefeld)

The solids contents were determined after the products are dried to a constant weight at 140° C.

The viscosities were measured with a Type LVF Brookfield viscosimeter at 60 r.p.m. The average particle size was determined by means of a photon correlation spectrometer (BI 90, Volume Average Particle Size, reading in nm). The mole mass distribution of the dextrins (Table 1) was determined by chromatography with sulfonated PS-divinylbenzene resin (Showa Denko, Ionpak S800). Calibration was effected with Pullulan and eluting with 0.5% aqueous NaCl solution.

It will be understood that the specification and examples are illustrative but not limitative of the present invention and that other embodiments within the spirit and scope of the invention will suggest themselves to those skilled in the art.

What is claimed is:

1. A process for the production of an aqueous polymer dispersion comprising:
   polymerizing an ethylenically unsaturated diene monomer or a mixture of monomers consisting of
   20% to 100% by weight of a diene monomer,
   0% to 80% by weight of a vinyl-aromatic monomer, and
   0% to 50% by weight of an ethylenically unsaturated monomer,
   by means of one or more free radical initiators in the presence of an aqueous dextrin solution or dispersion containing 10 parts to 200 parts by weight dextrins, wherein the content of said dextrins having a molecular weight in excess of 5000 is at least 50% by weight and the content of said dextrins having a molecular weight in excess of 10,000 is not in excess of 5% by weight of the dextrin component.

2. The process of claim 1, wherein said dextrins are chemically modified

3. The process of claim 1, wherein polymerization reaction is carried out in the further presence of one or more adjuvants.

4. The process of claim 1, wherein the content of dextrin having a molecular weight in excess of 5000 is at least 55% by weight of the dextrin component.

5. The process of claim 1, wherein the content of dextrin having a molecular weight in excess of 5000 is at least 65% by weight of the dextrin component.

6. The process of claim 1, wherein the diene monomer is selected from the group consisting of 1,3-butadiene, isoprene and cyclobutadiene.

7. The process of claim 1, wherein the diene monomer is 1,3-butadiene.

8. The process of claim 1, wherein the vinyl aromatic compound is selected from the group consisting of styrene, alpha-methylstyrene, 4-methylstyrene and mixtures of any of the foregoing, and the ethylenically unsaturated monomers are selected from the group consisting of (meth)acrylic esters of $C_1$ to $C_{18}$ alcohols; unsaturated mono- or dicarboxylic acids; amides of unsaturated monocarboxylic acids; anionic comonomers; cationic comonomers; multifunctional cross-linking comonomers or methylol meth(acrylamides) and derivatives thereof; and mixtures of any of the foregoing ethylenically unsaturated monomers.

9. The process of claim 8, wherein the ethylenically unsaturated monomers are selected from the group consisting of ethyl(meth)acrylate, butyl(meth)acrylate, stearyl acrylate, (meth)acrylonitrile, (meth)acrylic acid, maleic acid, fumaric acid, itaconic acid, (meth)acrylamide, salts of styrenesulfonic acid, salts of acrylamidalkylsulfonic acid, 2-dimethylaminoethyl(meth)acrylate, N-di-methylaminopropyl(meth)acrylamide, 2-trimethylammonium-methyl(meth)acrylate-chloride, N-trimethyl-ammoniumpropyl(meth)acrylamide-chloride, divinylbenzene, i-propoxymethyl(meth)acrylamide, or methoxymethyl(meth)acrylamide.

10. The process of claim 1, 4 or 5, wherein said entire aqueous dextrin solution or dispersion is continuously charged into a polymerization reactor separately and simultaneously with the monomer or monomer mixture.

11. The process of claim 1, 4 or 5, wherein said aqueous dextrin solution or dispersion is homogeneously mixed with the monomer or monomer mixture immediately prior to charging the resulting entire mixture to a polymerization reactor.

12. The process of claim 11, wherein said dextrin component is cationically modified dextrin.

13. The process of claim 12, wherein said aqueous dextrin solution or dispersion contains 10 parts to 200 parts by weight solids per 100 parts by weight monomer or monomer mixture.

14. The process of claim 13, wherein said aqueous dextrin solution or dispersion contains 25 parts to 100 parts by weight solids per 100 parts by weight monomer or monomer mixture.

15. The process of claim 14, wherein said polymerization is carried out at a temperature of 0° C. to 120° C.

16. The process of claim 15, wherein said polymerization is carried out at a temperature of from 40° C. to 100° C.

17. The process of claim 15, wherein said free radical initiator is an alkali metal salt or an ammonium salt of peroxyidisulfonic acid.

18. The process of claim 17, wherein said free radical initiator is present in an amount of at least 0.1% by weight of the total amount of monomer.

19. The process of claim 17, wherein said mixed monomers comprise,
   20% to 70% by weight 1,3-butadiene,
   30% to 80% by weight styrene,
   0% to 15% by weight acrylonitrile, and
   0% to 5% by weight ethylenically unsaturated mono- or dicarboxylic acid.

20. The process of claim 18, wherein said ethylenically unsaturated mono- or dicarboxylic acid is selected from acrylic acid and itaconic acid or a mixture thereof.

21. A polymer dispersion prepared by the process of claim 1, 4 or 5, wherein the average particle diameter is less than about 250 nm, the viscosity measured at a solids content of 50±1% by weight is less than 2000 mpas, and the solids concentration is at least 50% by weight.

* * * * *

UNITED STATES PATENT AND TRADEMARK OFFICE
CERTIFICATE OF CORRECTION

PATENT NO. : 5,147,907

DATED : September 15, 1992

INVENTOR(S) : Rinck et al.

It is certified that error appears in the above-identified patent and that said Letters Patent is hereby corrected as shown below:

Col. 2, lines 28-29 change to read "$C_1$ to $C_{18}$".

Col. 2, line 59 change to read "ethylenically".

Signed and Sealed this

First Day of March, 1994

BRUCE LEHMAN

*Attest:*

*Attesting Officer* — *Commissioner of Patents and Trademarks*